Figure 1:
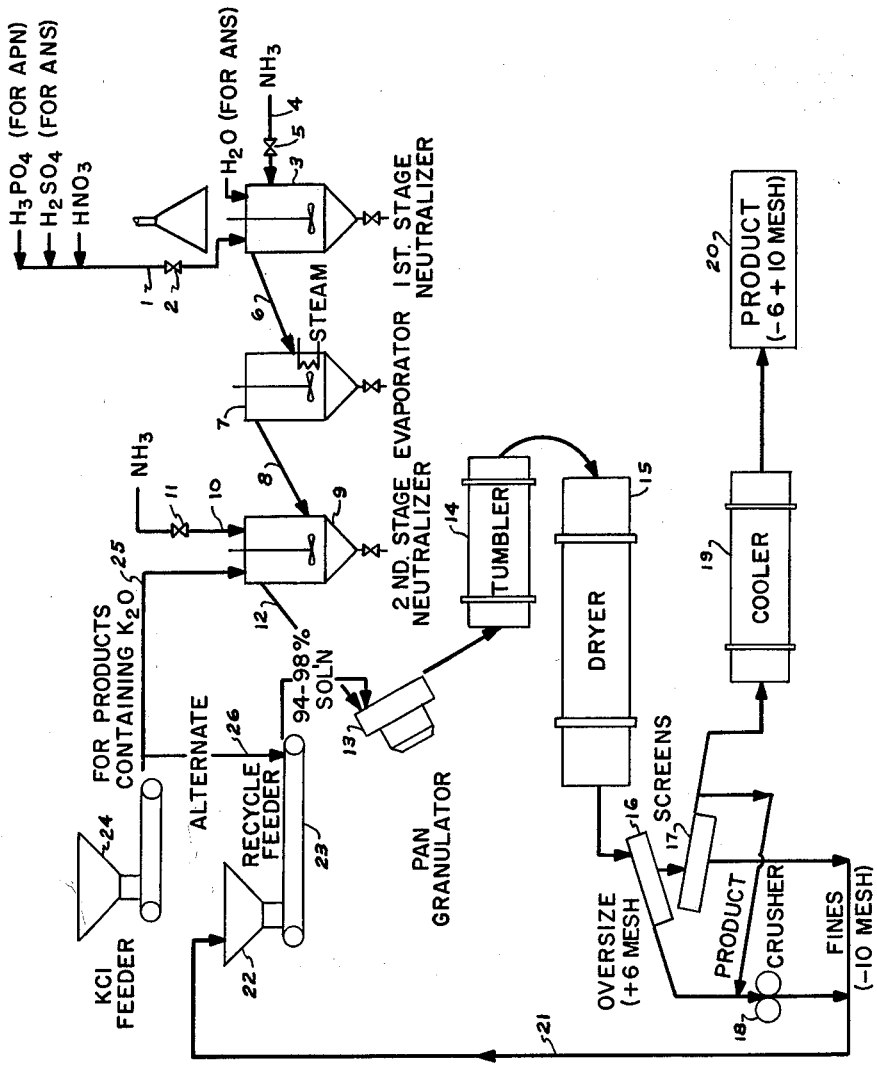

Jan. 12, 1965

I. W. McCAMY ETAL 3,165,395

METHOD FOR THE PRODUCTION OF GRANULAR
HIGH-NITROGEN AND MIXED FERTILIZERS
Filed April 4, 1962

INVENTORS.
Isaac W. McCamy
James L. Graham
Milton R. Siegel
BY Robert A. Petruzak
Agent United States Patent Office 3,165,395
Patented Jan. 12, 1965

3,165,395
METHOD FOR THE PRODUCTION OF GRANULAR HIGH-NITROGEN AND MIXED FERTILIZERS
Isaac W. McCamy, Sheffield, James L. Graham, Muscle Shoals, and Milton R. Siegel, Florence, Ala., assignors to Tennessee Valley Authority, a corporation of United States
Filed Apr. 4, 1962, Ser. No. 185,169
6 Claims. (Cl. 71—34)
(Granted under Title 35, U.S. Code (1952), sec. 266)

The invention herein described may be manufactured and used by or for the Government for governmental purposes without the payment to us of any royalty therefor.

Our invention relates to an improved process for the continuous manufacture of granular high-nitrogen and mixed fertilizers, and more particularly to a highly versatile process incorporating the use of a pan granulator for the production of high-nitrogen and mixed fertilizers of a large variety.

The fertilizer industry has recognized the trend toward the desirability of producing high-nitrogen and mixed fertilizers in granular form due to the need for better physical condition of high-analysis grades. Granulation of fertilizer material reduces caking, decreases dustiness, provides for easier and more uniform distribution, and results in a more attractive appearance of the product. Because of these benefits gained with granular high-analysis fertilizer material, farmers are beginning to demand granulation of all solid fertilizer grades. Furthermore, granulation of high-nitrogen fertilizer materials is highly desirable if such material is intended for later blending with other granular material.

Heretofore it has been the practice in the fertilizer industry to produce high-nitrogen and mixed fertilizers by one of the following methods: (1) mechanically mixing separately prepared materials each of which contains a single fertilizer ingredient; (2) blending materials containing one, two, or three fertilizer ingredients; and (3) manufacturing a blended product in which particles are essentially the same composition.

Of the above-mentioned methods for production of fertilizer material, the later method is presently the most widely used by the industry. However, normally only a few grades can be made by any one of the several processes for carrying out such method, said processes consisting of: (a) ammoniating solids in such rotating equipment as a pugmill with ammoniating solutions containing ammonium nitrate; (b) adding acidulating material to one or more solids in such rotating equipment and ammoniating the mixture with ammonia or ammoniating solution; (c) spraying highly concentrated solutions of salts containing one or two fertilizer ingredients into the top of prilling towers; and (d) in the case wherein mixed fertilizers of low-nitrogen content are desired by spraying ammoniating solutions onto a bed of solids containing superphosphate and one or more other fertilizer ingredients in an inclined rotary pan granulator.

Our invention is directed to a highly versatile process for the production of high-nitrogen and mixed fertilizers whereby the variety of fertilizer grades produced and obtainable thereby is significantly greater than any of the aforementioned prior-art processes.

We have overcome the difficulties inherent in the processes of the type of the prior art to a substantial extent in the present invention by a process which comprises spraying a highly concentrated solution of the appropriate salts onto a cascading bed of fine solids maintained in a pan granulator, said solution being of essentially the same composition as the final products; drying the resulting granular product; screening the resulting granular product to recover product-size material therefrom; cooling the onsize product; and crushing, cooling, and returning the oversize product, along with the undersize product, as recycle to the pan granulator. Furthermore, several new and advantageous features over conventional processes for the production of high-nitrogen and mixed fertilizer material are realized by the present invention.

Among these advantageous features are a process in which a great variety of high-analysis fertilizer products can be obtained; in which the investment costs are substantially lower than for prilling processes; the operation is safer than the short tower-prilling processes; lower recycle requirements than for other prior-art processes employing the use of rotating equipment; improved products of homogeneous composition containing from one to four fertilizer components; and which is more versatile than prior-art processes using conventional prilling towers in that all three primary nutrients can be added to the final product, in addition to insoluble secondary and trace elements, which insoluble materials would otherwise clog the solution distributors of conventional prilling towers.

It is therefore an object of the present invention to provide a process for the economical production of a great variety of high-nitrogen and complex mixed fertilizer materials which substantially eliminates the necessity for fertilizer production installations to invest in and maintain numerous types of fertilizer-producing equipment.

Another object of the present invention is to provide a process for the economical production of a great variety of high-nitrogen and complex mixed fertilizer materials in which loss of ammonia is negligible and which substantially eliminates the necessity for fertilizer production installations to invest in and maintain numerous types of fertilizer-producing equipment.

In carrying out the objects of our invention in one form thereof, we spray onto a cascading bed of fine solids maintained in a rotating pan granulator, a highly concentrated solution of the appropriate salts of essentially the same composition (dry basis) as the final product. The concentrated solutions of the appropriate salts are first prepared by partially neutralizing appropriate acids with anhydrous ammonia, concentrating the resulting solution by evaporation, and further neutralizing the resulting concentrated solution to neutrality. For production of fertilizers containing only nitrogen, or combinations of nitrogen and $P_2O_5$ or sulfur, the solution from the second-stage neutralizer is ready for processing in the pan granulator. For the production of fertilizer, containing $K_2O$, appropriate proportions of potassium chloride, potassium nitrates, potassium sulfate, and mixtures thereof may be added to the neutral concentrated solution in the second-stage neutralizer prior to processing in the pan granulator. We have discovered that a great variety of grades of granular high-nitrogen fertilizers may be produced easily in our process by the appropriate proportioning of feed materials into the process. The following table indicates only a few of the great variety of grades which we have produced in our process.

TABLE 1

| Product | Composition, percent by wt., after treating with 3% by wt. of anticaking agent | | | |
|---------|------|-------|------|---|
|         | N    | P₂O₅  | K₂O  | S |
| A       | 33.5 | 0     | 0    | 0 |
| B       | 31.0 | 0     | 0    | 5 |
| C       | 30.0 | 10.0  | 0    | 0 |
| D       | 21.0 | 0     | 21.0 | 0 |
| E       | 22.0 | 11.0  | 11.0 | 0 |
| F       | 17.0 | 17.0  | 17.0 | 0 |
| G       | 25.0 | 25.0  | 0    | 0 |

We have also discovered that numerous other formulations containing different ratios of plant food components within the range of the compositions listed in the above Table 1 may be made by simply varying the proportions of feed materials going into the process. The raw materials used in our process for making the various grades of fertilizer are as follows:

(1) Nitric acid containing 48 to 70 percent $HNO_3$.
(2) Phosphoric acid containing 57 to 76 percent $P_2O_5$; either electric-furnace or wet-process acid.
(3) Sulfuric acid—90 to 96 percent $H_2SO_4$.
(4) Anhydrous ammonia; either gaseous or liquid ammonia.
(5) Potassium chloride; or other fertilizer potassium salts.

Our invention, together with further objects and advantages thereof, will be better understood from a consideration of the following description taken in connection with the accompanying drawing in which:

FIGURE 1 is a flowsheet illustrating principles or novel process which results in the production of a great variety of high-nitrogen and complex mixed fertilizers.

Referring now more particularly to FIGURE 1, acidulating medium comprising phosphoric acid, sulfuric acid, or nitric acid, or mixtures thereof, from a source not shown, is fed through line 1 and any suitable means for controlling the rate of flow 2 into first-stage neutralizer 3, along with ammoniating fluid from a source, not shown, being fed through line 4 and any suitable means for controlling the rate of flow 5. The resulting partially neutralized acids are led from first-stage neutralizer 3 via line 6 to evaporator 7, wherein they are concentrated. The resulting concentrated partially neutralized acids are subsequently led via line 8 into second-stage neutralizer 9 wherein further neutralizing of the resulting concentrated solutions to neutrality is brought about by means of introduction of ammonia from a source, not shown, into second-stage neutralizer 9 through line 10 and any suitable means for controlling the rate of flow 11. The resulting concentrated neutral solutions are led from second-stage neutralizer 9 via line 12 and are subsequently sprayed onto a cascading bed of fine solids maintained in rotating pan granulator 13. The discharge from pan granulator 13 may be led through tumbler 14 and dryer 15 to sizing means generally illustrated as screens 16 and 17 and crusher 18. The onsize material may subsequently be led through cooler 19 and collected as product, as is generally illustrated at 20. The undersize material and crushed oversize material is led via line 21 to hopper 22 and recycle feeder 23 for feeding to the upper rim of pan granulator 13. In the instance wherein the product is to contain K₂O, potassium chloride may be fed through hopper 24 either directly via line 25 to second-stage neutralizer 9 or alternatively via line 26 to recycle feeder 23.

As can be seen from the above-mentioned flowsheet comprising FIGURE 1, the neutralization of acids is carried out in two steps with a concentration step between the neutralization steps. This permits the production of concentrated solutions of high-nitrogen salts containing one to four fertilizer ingredients with a minimum of ammonia losses. The product from the first-stage neutralization may be in a temperature range of 250° to 320° F., pH range of 1.0 to 4.0, and may contain 8 to 15 percent water. Water and/or air may be added to hold the temperature within the desired range. A conventional evaporator may be operated either at atmospheric pressure or under vacuum to reduce the water content of the solution to the range of 2–6 percent.

The effluent from the second-stage neutralizer may be in a temperature range of 300° F. to 370° F., pH range of 4.5 to 6.0, and may contain from 2–6 percent water. Conventional tank-type neutralizers, equipped with agitators and acid and ammonia spargers, may be used for both neutralization steps. Either gaseous or liquid anhydrous ammonia may be used. The acids are proportioned to the neutralizers and the ammonia rate is controlled to maintain the desired pH.

Granulation is carried out in an inclined rotary pan granulator by spraying the concentrated solution of the appropriate salts from the second-stage neutralization step onto the cascading section of dry solids in the pan granulator. The solids are recycle fines from the screening and crushing operations and are essentially of the same composition as the final product. Best operation is obtained when the temperature of product from the pan is 210° F. to 230° F. and the granulator speed and angle of tilt are such that the material from the granulator is predominantly of the desired product size. A speed of 30 revolutions per minute and an angle of 60 to 70 degrees from horizontal gave a product that was predominantly minus 6- plus 10-mesh in size during tests with a pilot-plant pan granulator 38 inches in diameter and 9 inches deep. The most satisfactory recycle to product ratio is 1:1 to 2:1. Cooling of the recycle material may lower the recycle ratio. The granular product may be further rounded and compacted by passing through a rotary tumbler. Although this step is not critical for the process, better formed product will result from its use. Elimination of flights from the first few feet of the dryer also should accomplish the same results.

The product from the tumbler is dried in a conventional rotary dryer to a moisture content of about 0.2 percent. Heated air is used in the drying operation. The temperature of the product from the dryer may be in the range of 220° F. to 260° F. Two dryers operated in series, with a screening step between the two dryers, may also be used. In this case, only the onsize product would enter the second dryer. The product from the drying step is screened to the desired size. The oversize fraction is crushed and combined with the undersize fraction to be used as recycle material for the granulation step. The onsize fraction from the screens (usually minus 6- plus 10-mesh in size) is cooled in a conventional rotary cooler to a temperature in the range of 95° F. to 120° F. A portion of the onsize product may be returned to the crushers to provide additional recycle material for the process. The cooled product may be treated with an anticaking agent such as calcined fuller's earth and bagged or used as bulk material.

Formulations containing K₂O are prepared by adding potassium chloride to the second-stage neutralizer where it forms a solution or slurry with the other fertilizer components. The potassium chloride may be added also as a solid to the recycle material to the granulator. Either granular or finely ground potassium chloride may be used in the process.

Thus it can be seen from the disclosure of the present invention that we have discovered a new and novel process incorporating the use of a rotary pan granulator for making high-nitrogen and high-analysis mixed fertilizers by means of a two-stage neutralization of appropriate acids with anhydrous ammonia with an evaporation or solution concentration step being carried out between the two neutralization steps.

In order that those skilled in the art may better understand how the present invention can be practiced and more fully and definitely understood, the following example of a process which we have used in making a granular 30–10–0 ammonium phosphate nitrate fertilizer of the character indicated herein is given by way of illustration and not by way of limitation.

*Example I*

A pilot-plant test was made in equipment similar to that shown in FIGURE 1 in which granular 30–10–0 ammonium phosphate nitrate was produced at a rate of 1000 pounds per hour in a 38-inch-diameter pan granulator. Electric-furnace phosphoric acid (67% $P_2O_5$) at the rate of 181 pounds per hour and nitric acid (60.9% $HNO_3$) at the rate of 1027 pounds were metered continuously to the first-stage neutralizer where sufficient anhydrous gaseous ammonia was added to maintain a pH of 2.9 in the effluent from the neutralizer. The liquor from the first-stage neutralizer contained 7.0 percent water and was at a temperature of 317° F. The liquor then passed through an open tank containing steam coils where it was heated to 330° F. to remove a portion of the water. It then flowed by gravity to the second-stage neutralizer where additional ammonia was added to maintain pH of the solution at 5.1. The solution containing 29.1 percent nitrogen, 10.8 percent $P_2O_5$ and 6.3 percent water, and at a temperature of 369° F. was sprayed on the cascading portion of the bed of recycle material in the pan granulator. Recycle fines at a rate of 1310 pounds per hour and a temperature of 158° F. were used during the run (recycle ratio of 1.3 lb. recycle/lb. product). The granulator product containing 71 percent minus 6- plus 10-mesh material was dried at 255° F. and screened at minus 6- plus 10-mesh. Part of the onsize product, along with the oversize fraction, was crushed and combined with the undersize fraction from the screen for use as recycle material. The product fraction (−6 +10 mesh) contained 30.8 percent nitrogen, 10.8 percent $P_2O_5$, all of which was water-soluble. The moisture content of the product was 0.2 percent $H_2O$. Nitrogen losses from the neutralization steps amounted to less than 2.0 percent of the input. Nitrogen losses elsewhere in the process were negligible.

While we have shown our invention in but a single example and a limited number of illustrations, it will be obvious to those skilled in the art that it is not so restricted, but is susceptible to various changes and modifications without parting from the spirit thereof, and we desire therefore that only such limitations shall be placed thereupon as are specifically set forth in the appended claims. Also, while we have made specific reference to the production of ammonium phosphate nitrate fertilizer, our invention is applicable to a great variety of high-nitrogen and high-analysis complex mixed fertilizers.

What we claim as new and desire to secure by Letters Patent of the United States is:

1. A process for the production of high-nitrogen fertilizers which comprises the steps of simultaneously introducing a stream of acidulating material selected from the group consisting of phosphoric acid, sulfuric acid, nitric acid, and mixtures thereof, and a stream of ammoniating fluid into a first-stage neutralization zone; controlling the ratio of introduction of each of said streams so as to maintain a pH in said first-stage neutralization zone in the range from about 1 to 4; withdrawing the resulting partially neutralized acid stream from said first-stage neutralization zone to evaporating means, therein concentrating said partially neutralized acid stream to a concentration greater than about 90 percent by weight; withdrawing said concentrated and partially neutralized acid stream from said evaporating means to a second-stage neutralization zone; simultaneously introducing a stream of ammoniating fluid into said second-stage neutralization zone, together with the stream from said evaporating means, and therein neutralizing said partially neutralized and concentrated acid stream to a pH in the range from about 4.5 to 6.0; withdrawing a resulting concentrated and substantially neutralized stream of material from said second-stage neutralization zone of substantially the same composition (dry basis) as the product recovered in a later-mentioned product removal step; maintaining in a horizontally inclined rotating pan a bed of fines recycled from a later-mentioned sizing step in continuous and alternate rising and cascading motion; spraying said concentrated and substantially neutralized stream of material withdrawn from said second-stage neutralization zone onto the cascading portion of said bed of fines; discharging continuously over the lower rim of said horizontally inclined rotating pan a granular high-analysis fertilizer material; sizing said withdrawn material; returning the undersize and crushed oversize material to the upper rim of said horizontally inclined rotating pan; and withdrawing the onsize material as product.

2. A process for the production of high-nitrogen fertilizers which comprises the steps of simultaneously introducing a stream of acidulating material selected from the group consisting of phosphoric acid, sulfuric acid, nitric acid, and mixtures thereof, and a stream of ammoniating fluid into a first-stage neutralization zone; controlling the ratio of introduction of each of said streams so as to maintain a pH in said first-stage neutralization zone in the range from about 1 to 4; maintaining a temperature in said first-stage neutralization zone in the range from about 250° F. to 320° F.; withdrawing the resulting partially neutralized acid stream from said first-stage neutralization zone to evaporating means, therein concentrating said partially neutralized acid stream to a concentration greater than about 90 percent by weight; withdrawing the resulting concentrated and partially neutralized acid stream from said evaporating means to a second-stage neutralization zone; simultaneously introducing a stream of ammoniating fluid into said second-stage neutralization zone, together with the stream from said evaporating means, and therein neutralizing said partially neutralized and concentrated acid stream to a pH in the range from about 4.5 to 6.0; maintaining a temperature in said second-stage neutralization zone in the range from about 300° F. to 370° F.; withdrawing a resulting concentrated and substantially neutralized stream of material from said second-stage neutralization zone of substantially the same composition (dry basis) as the product recovered in a later-mentioned product removal step; maintaining in a horizontally inclined rotating pan a bed of fines recycled from a later-mentioned sizing step in continuous and alternate rising and cascading motion; spraying said concentrated and substantially neutralized stream of material withdrawn from said second-stage neutralization zone onto the cascading portion of said bed of fines; discharging continuously over the lower rim of said horizontally inclined rotating pan a granular high-analysis fertilizer material; sizing said withdrawn material; returning the undersize and crushed oversize material to the upper rim of said horizontally inclined rotating pan; and withdrawing the onsize material as product.

3. A process for the production of a high-nitrogen fertilizer containing about 30 weight percent N and about 10 weight percent $P_2O_5$, which comprises the steps of simultaneously introducing a stream of acidulating material consisting of a mixture of phosphoric acid and nitric acid and a stream of ammoniating fluid selected from the group comprising liquid ammonia, gaseous ammonia, and mixtures thereof into a first-stage neutralization zone; controlling the ratio of introduction of each of said streams so as to maintain a pH in said first-stage neutralization zone in the range from about 1 to 4;

maintaining a temperature in said first-stage reaction zone in the range from about 250° F. to 320° F.; withdrawing the resulting partially neutralized acid stream from said first-stage neutralization zone to evaporating means, therein concentrating said partially neutralized acid stream to a concentration containing about 30 weight percent nitrogen, about 10 weight percent $P_2O_5$, and about 4 weight percent water; withdrawing the resulting concentrated and partially neutralized acid stream from said evaporating means to a second-stage neutralization zone; simultaneously introducing a stream of ammoniating fluid selected from the group comprising liquid ammonia, gaseous ammonia, and mixtures thereof into said second-stage neutralization zone, together with the stream from said evaporating means, and therein neutralizing said partially neutralized and concentrated acid stream to a pH in the range from about 4.5 to 6.0; maintaining a temperature in said second-stage neutralization zone in the range from about 300° F. to 370° F.; withdrawing the resulting concentrated and substantially neutralized stream of material from said second-stage neutralization zone; maintaining in a horizontally inclined rotating pan a bed of fines recycled from a later-mentioned sizing step in continuous and alternate rising and cascading motion; spraying said concentrated and substantially neutralized stream of material withdrawn from said second-stage neutralization zone onto the cascading portion of said bed of fines; discharging continuously over the lower rim of said horizontally inclined rotating pan a granular high-analysis fertilizer material containing about 30 weight percent nitrogen and about 10 weight percent $P_2O_5$; sizing said withdrawn material; returning the undersize and crushed oversize material to the upper rim of said horizontally inclined rotating pan; and withdrawing the onsize material as product.

4. A process for the production of high-analysis complex mixed fertilizers which comprises the steps of simultaneously introducing a stream of acidulating material selected from the group consisting of phosphoric acid, sulfuric acid, nitric acid, and mixtures thereof, and a stream of ammoniating fluid into a first-stage neutralization zone; controlling the ratio of introduction of each of said streams so as to maintain a pH in said first-stage neutralization zone in the range from about 1 to 4; withdrawing the resulting partially neutralized acid stream from said first-stage neutralization zone to evaporating means, therein concentrating said partially neutralized acid stream to a concentration greater than about 90 percent by weight; withdrawing said concentrated and partially neutralized acid stream from said evaporating means to a second-stage neutralization zone; simultaneously introducing a stream of ammoniating fluid and a stream of $K_2O$ derivative material selected from the group consisting of potassium chloride, potassium nitrate, potassium sulfate, and mixtures thereof, into said second-stage neutralization zone, together with the stream from said evaporating means, therein neutralizing said partially neutralized and concentrated acid stream to a pH in the range from about 4.5 to 6.0; withdrawing a resulting concentrated and substantially neutralized stream of material from said second-stage neutralization zone of substantially the same composition (dry basis) as the product recovered in a later-mentioned product removal step; maintaining in a horizontally inclined rotating pan a bed of fines recycled from a later-mentioned sizing step in continuous and alternate rising and cascading motion; spraying said concentrated substantially neutralized stream of material withdrawn from said second-stage neutralization zone onto the cascading portion of said bed of fines; discharging continuously over the lower rim of said horizontally inclined rotating pan a granular high-analysis complex mixed fertilizer material; sizing said withdrawn material; returning the undersize and crushed oversize material to the upper rim of said horizontally inclined rotating pan; and withdrawing the onsize material as product.

5. A process for the production of high-analysis complex mixed fertilizers which comprises the steps of simultaneously introducing a stream of acidulating material selected from the group consisting of phosphoric acid, sulfuric acid, nitric acid, and mixtures thereof, and a stream of ammoniating fluid into a first-stage neutralization zone; controlling the ratio of introduction of each of said streams so as to maintain a pH in said first-stage neutralization zone in the range from abut 1 to 4; maintaining a temperature in said first-stage neutralization zone in the range from about 250° F. to 320° F.; withdrawing the resulting partially neutralized acid stream from said first-stage neutralization zone to evaporating means, therein concentrating said partially neturalized acid stream to a concentration greater than about 90 percent by weight; withdrawing said concentrated and partially neutralized acid stream from said evaporating means to a second-stage neutralization zone; simultaneously introducing a stream of ammoniating fluid and a stream of $K_2O$ derivative material selected from the group consisting of potassium chloride, potassium nitrate, potassium sulfate, and mixtures thereof, into said second-stage neutralization zone, together with the stream from said evaporating means, and therein neutralizing said partially neutralized and concentrated acid stream to a pH in the range from about 4.5 to 6.0; maintaining a temperature in said second-stage neutralization zone in the range from about 300° F. to 370° F.; withdrawing a resulting concentrated and substantially neutralized stream of material from said second-stage neutralization zone of substantially the same composition (dry basis) as the product recovered in a later-mentioned product removal step; maintaining in a horizontally inclined rotating pan a bed of fines recycled from a later-mentioned sizing step in continuous and alternate rising and cascading motion; spraying said concentrated and substantially neutralized stream of material withdrawn from said second-stage neutralization zone onto the cascading portion of said bed of fines; discharging continuously over the lower rim of said horizontally inclined rotating pan a granular high-analysis complex mixed fertilizer material; sizing said withdrawn material; returning the undersize and crushed oversize material to the upper rim of said horizontally inclined rotating pan; and withdrawing the onsize material as product.

6. A process for the production of a high-analysis complex mixed fertilizer containing about 17 weight percent N, about 17 weight percent $P_2O_5$ and about 17 weight percent $K_2O$, which comprises the steps of simultaneously introducing a stream of acidulating material consisting of phosphoric acid and nitric acid and a stream of ammoniating fluid selected from the group comprising liquid ammonia, gaseous ammonia, and mixtures thereof into a first-stage neutralization zone; controlling the ratio of introduction of each of said streams so as to maintain a pH in said first-stage neutralization zone in the range from about 1 to 4; maintaining a temperature in said first-stage reaction zone in the range from about 250° F. to 320° F.; withdrawing the resulting partially neutralized acid stream from said first-stage neutralization zone to evaporating means, therein concentrating said partially neutralized acid stream to a concentration containing about 17 weight percent nitrogen, about 17 weight percent $P_2O_5$, about 17 weight percent $K_2O$, and about 4 weight percent water; withdrawing said concentrated and partially neutralized acid stream from said evaporating means to a second-stage neutralization zone; simultaneously introducing a stream of ammoniating fluid selected from the group comprising liquid ammonia, gaseous ammonia, and mixtures thereof and a stream of $K_2O$ derivative material selected from a group consisting of potassium chloride potassium nitrate, potassium sulfate, and mixtures thereof, into said second-stage neutralization zone, together with the stream from said evaporating means, and therein neutralizing said partially neutralized and concentrated acid stream to a pH in the range from about 4.5 to 6.0; maintaining a temperature in said second-stage neutralization zone in the range from about 300° F. to 370° F.; withdrawing a resulting concentrated and substantially neutralized stream of material from said second-stage neutralization zone; maintaining in a horizontally inclined rotating pan a bed of fines recycled from a later-mentioned sizing step in continuous and alternate rising and cascading motion; spraying said concentrated and substantially neutralized stream of material withdrawn from said second-stage neutralization zone onto the cascading portion of said bed of fines; discharging continuously over the lower rim of said horizontally inclined rotating pan a granular high-analysis complex mixed fertilizer material containing about 17 weight percent N, about 17 weight percent $P_2O_5$, and about 17 weight percent $K_2O$; sizing said withdrawn material; returning the undersize and crushed oversize material to the upper rim of said horizontally inclined rotating drum; and withdrawing the onsize material as product.

References Cited by the Examiner
UNITED STATES PATENTS

| | | | |
|---|---|---|---|
| 2,707,676 | 5/55 | Picot et al. | 71—39 |
| 2,726,949 | 12/55 | Andres et al. | 71—39 X |
| 2,899,293 | 8/59 | Munekata | 71—43 |
| 2,902,342 | 9/59 | Kerley | 71—43 X |
| 2,945,754 | 7/60 | Hignett et al. | 71—43 X |
| 3,005,696 | 10/61 | Hignett et al. | 71—43 X |
| 3,005,697 | 10/61 | McKnight et al. | 71—43 X |

DONALL H. SYLVESTER, *Primary Examiner.*

ANTHONY SCIAMANNA, *Examiner.*